March 15, 1949. J. A. MONTGOMERY ET AL 2,464,707
SEWAGE DISPOSAL APPARATUS
Original Filed June 11, 1942 2 Sheets-Sheet 1
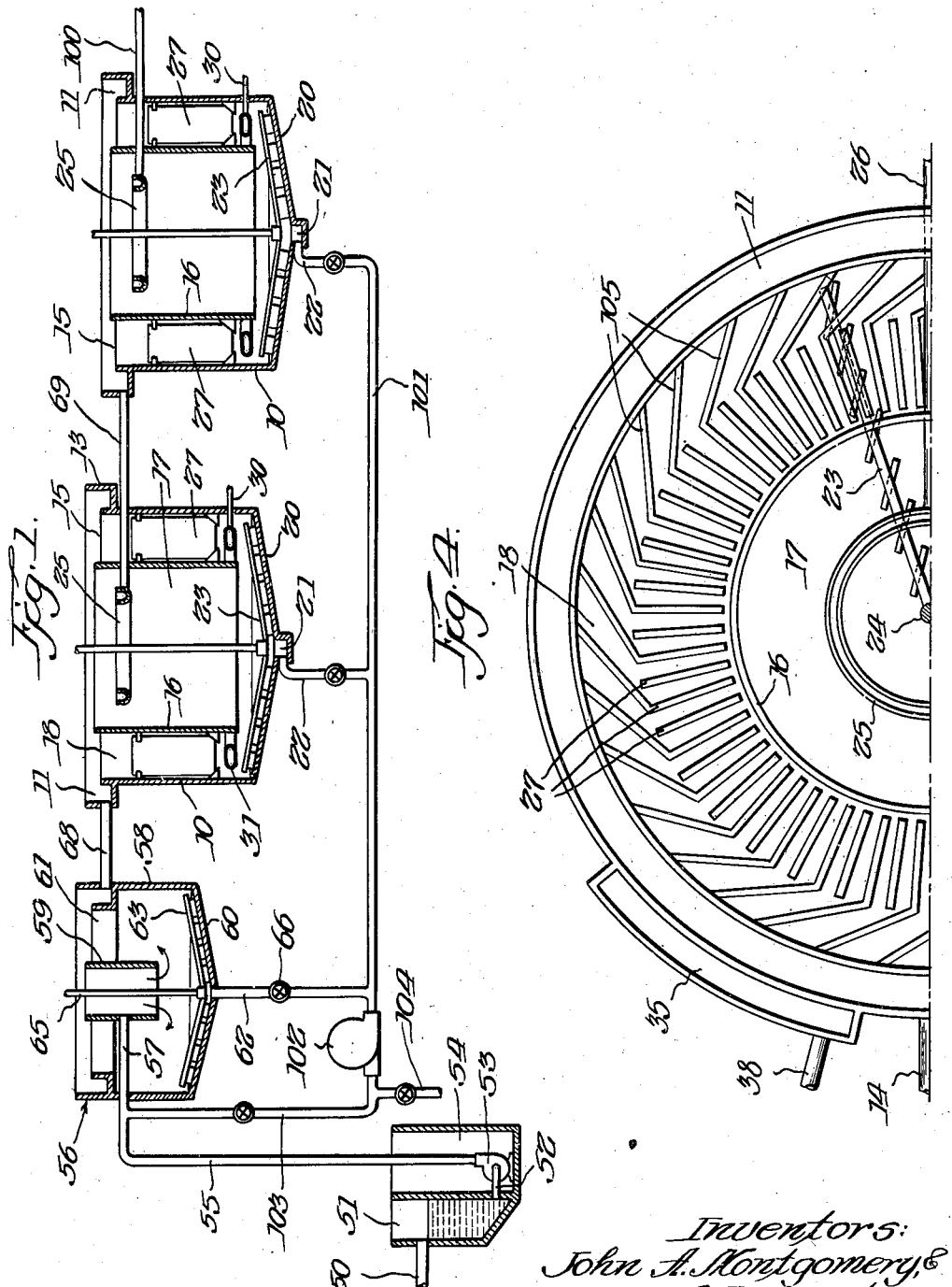
Inventors:
John A. Montgomery &
Louis E. Livingston:
By: Wilkinson Huxley Dunn & Knight
Attys March 15, 1949.   J. A. MONTGOMERY ET AL   2,464,707
SEWAGE DISPOSAL APPARATUS
Original Filed June 11, 1942   2 Sheets-Sheet 2
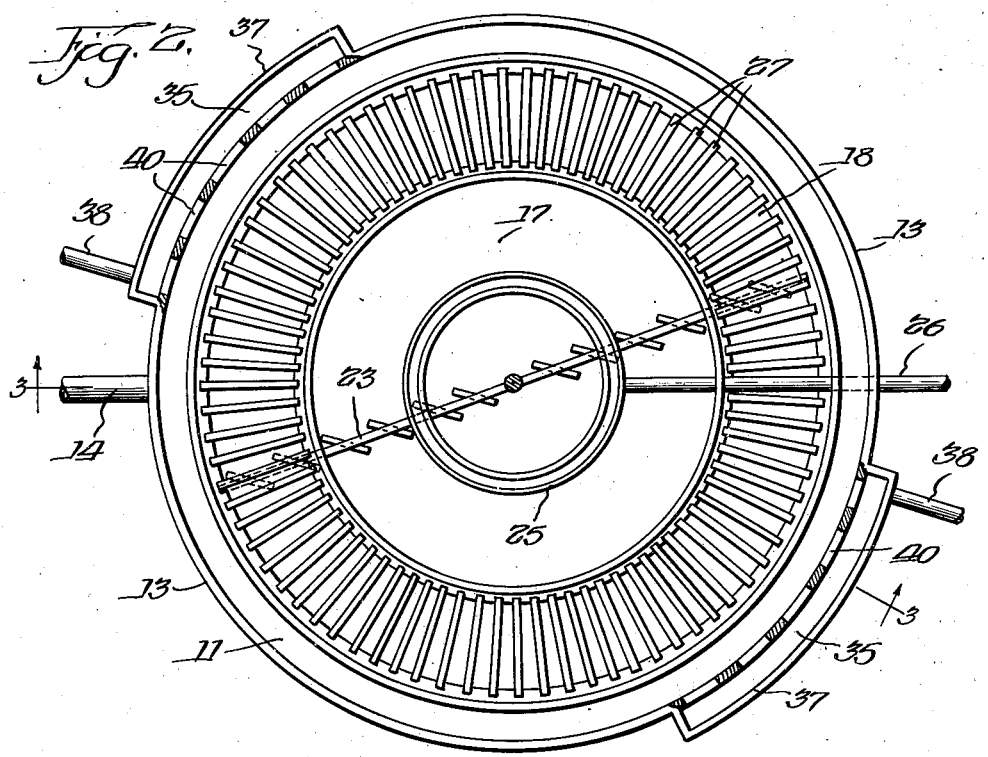
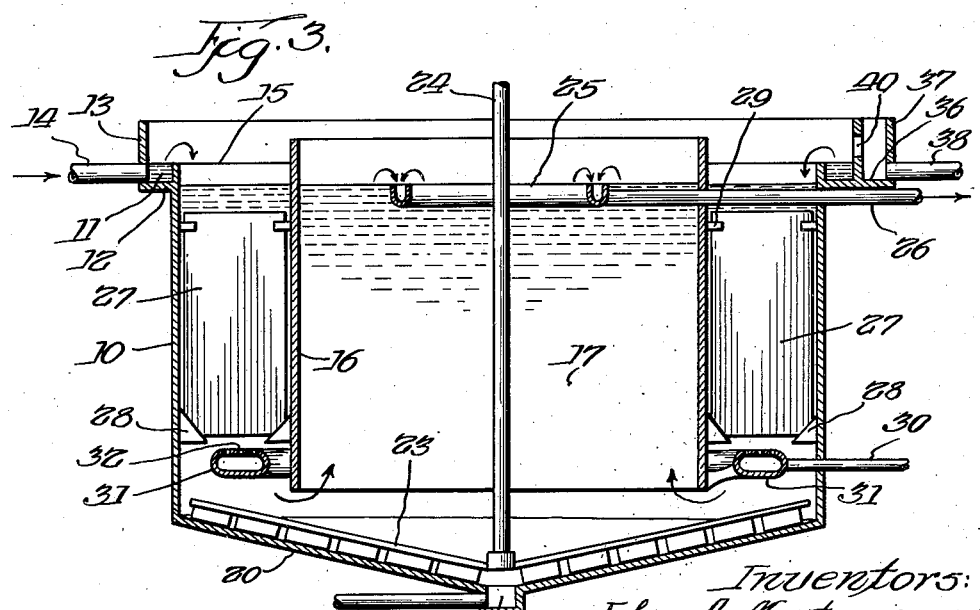
Inventors:
John A. Montgomery &
Louis E. Livingston Patented Mar. 15, 1949

2,464,707

UNITED STATES PATENT OFFICE 2,464,707

SEWAGE DISPOSAL APPARATUS

John A. Montgomery, Denver, Colo., and Louis E. Livingston, Dallas, Tex., assignors to Lakeside Engineering Corporation, Chicago, Ill., a corporation of Illinois Original application June 11, 1942, Serial No. 446,576. Divided and this application December 4, 1944, Serial No. 566,606

4 Claims. (Cl. 210—7)

The invention relates to sewage disposal and has reference more particularly to sewage treating apparatus of improved construction and operation and wherein greater purification is secured by uniformly distributing the organic load to filter media contained in an aeration chamber, by simultaneously aerating said organic load while passing through said media, and by subjecting the same to clarification in a contiguous settling chamber.

This application is a division of our Patent No. 2,388,795 granted November 13, 1945 and entitled Sewage disposal.

In the treatment of domestic sewage by trickling filters it is difficult to obtain a high degree of purification, that is, purification in excess of ninety per cent over-all reduction of the biological oxygen demand of the raw sewage, unless two or more filters are used in series and each filter followed by clarification. Moreover, even when two or more filters are used in series, separated by an intermediate clarifier, the final effluent is not as clear as the effluent from an activated sludge process but is more or less turbid and has a brownish cast.

The excess sludge or bacteria formed in a trickling filter is continuously withdrawn and is carried with the liquid to the intermediate clarifying tank. Additional purification can be obtained by delivering the solution from the intermediate clarifier to a contact filter in which the filter media is completely submerged and the solution is caused to contact biological organisms on the surface of the media in the presence of an abundance of oxygen supplied by air. Additional purification is also obtained in the contact filter through the flocculating action caused by the movement of the air upwardly through the liquid. The air is used to coagulate the colloidal material in the sewage and to oxidize the undissolved, unstaple organic compounds and some inorganic materials such as hydrogen sulphide into staple form. Also the agitation with air aids in floating grease particles that may be present in the sewage.

In using the activated sludge process and also in the use of contact filters it is customary to bring the incoming sewage to the aerators at one end of the tank or one side thereof and to flow the sewage across the tank to the outlet. Such procedure often results in short circuiting of the aeration chamber. Moreover, it does not provide a method for keeping the flocculated grease from passing through the entire plant. In addition, especially with contact filters, the bulk of the organic load entering the aeration chamber comes into contact with a relatively small portion of the filter media during the first few minutes of contact. A further difficulty in connection with contact filters is that the excess sludge is deposited below the contact media and must be drawn off by gravity or by means of moving rakes or chains. The use of the latter entails expensive construction and difficulties in operation. If a mechanical means or raking or moving the sludge from the lower portion of the aeration chamber is not employed the sludge must be collected in hoppers before it can be withdrawn from the tank. This results in an excess of sludge accumulation on the hopper walls and very soon septic action starts and the sludge rises to the surface of the tank.

An object of the present invention is to provide a combination tank of improved construction and operation having an aeration chamber in contiguous and connecting relation with a settling chamber and which will provide for greater purification of sewage and the like by introducing the incoming solution around the periphery of the aeration chamber to more evenly distribute the organic load to the filter media and to bring said organic load into contact with a greater portion of the air passing upwardly through the liquid.

A further object is to provide apparatus for treating sewage having an aeration chamber combined with a settling chamber and wherein the chambers are separated for the greater portion of their depth, having a connecting passage, however, below the air supply to the aeration chamber and which provides a weir of generally circular extent so that the flow of the liquid between chambers takes place at a minimum velocity.

Another object is to provide apparatus in which skimming, flocculating, oxidation by air, and settling are all accomplished in a single tank.

A more specific object is to provide a tank combining a contact filter wtih a clarifying chamber and wherein any grease in the sewage undergoing treatment will be coagulated and collected on the surface of the liquid in the contact filter section so that the same may be readily diverted to a grease launder either continuously during the operation of the apparatus or at intervals.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a sectional view illustrating diagrammatically the manner of using two combination tanks of the invention in series with a primary clarifier;

Figure 2 is a plan view of the combination filter and settling tank embodying the improvements of the invention;

Figure 3 is a vertical sectional view through the combination tank taken substantially along line 3—3 of Figure 2; and Figure 4 is a fragmentary plan view illustrating a modified construction of the combination tank wherein the filter material in the aeration chamber is increased.

Referring more particularly to the construction shown in Figures 2 and 3, the apparatus of the invention is illustrated as including an outer peripheral wall 10 having a launder 11 formed by the outwardly projecting horizontal base wall 12, and by the vertical wall 13. The launder is supplied with sewage or other liquid to be processed by the inlet pipe 14 which passes through the vertical wall 13 of the launder. Overflow of the liquid therefore takes place with respect to the weir 15 formed by the upper edge of the wall 10 of the tank. As a result the liquid is uniformly distributed within the aeration chamber of the tank which is formed by the exterior wall 10 and by the interior concentric baffle wall 16. In the particular design of tank disclosed the baffle wall 16 divides the same into a central clarifying chamber 17 and into a peripheral aeration chamber 18, the last mentioned chamber occupying the space between wall 10 and the said baffle wall 16.

The sloping bottom wall 20 of the tank is formed with a sump 21 having connection with a sludge drawoff pipe 22. Rotating sweeper arms 23 are located within the base of the tank, being suitably supported and rotated by the vertical shaft 24 which extends upwardly through the clarifying chamber 17. The rotating sweeper arms 23 are thus disposed above the sloping bottom wall 20 and their action when rotating is to direct the sludge deposited on the bottom wall into the sump 21 so that the same may be withdrawn from the tank by the drawoff pipe 22. The clear effluent from the clarifying chamber 17 is continuously withdrawn by the circular outlet member 25, channel shaped in cross section and having connection with the outlet pipe 26 which extends through baffle wall 16 and through wall 10 of the tank. The position of the outlet ring 25 vertically of the clarifying chamber determines the level of the liquid within the tank.

The aeration chamber 18 is provided with filter media in the form of plates 27 supported in an upright position within the peripheral chamber by members 28. Similar members 29 at the upper end of the plates function as spacing elements and form slots for receiving said plates. A large number of plates are provided extending completely around the aeration chamber and being disposed radially with respect to the center of the tank. In addition to the plates other surface providing material such as tile, crushed rock and the like may be used. Air is supplied to the filter media within the aeration chamber by the air supply pipe 30 which passes through the outer wall 10 of the tank and has connection with the annular pipe 31 which is perforated as at 32 so as to discharge air in an upward direction. The annular pipe 31 is suitably supported in position under the plates 27 and it will be observed that the same extends completely around the aeration chamber so that all sections thereof are supplied with currents of air which issue under pressure from the perforations 32 of the pipe. These air currents pass upwardly between the plates 27 and promote the growth of biological organisms on the surface of the plates. The air currents pass upwardly to the surface of the liquid in the aeration chamber, whereas the flow of the liquid in this chamber is in a downward direction. The downwardly flowing liquid is thus aerated and also biological slime coatings are formed on the respective surfaces of the plates. The coatings further purify the liquid by nitrifying the organic substances in the sewage, reducing them to simple salts, and the remaining solids are caused to coagulate into settleable solids, which are eventually precipitated in the clarifying chamber.

The two chambers provided within the combination tank are separated for the greater portion of their depth by the baffle wall 16. However, said baffle wall terminates a distance above the sloping bottom wall 20 or more properly, a short distance below the annular air pipe 31. This lower edge of the baffle wall thus forms a circular weir and the space between the weir and the sloping bottom of the tank forms a connecting passage between the aeration chamber, containing the filter media, and the clarifying chamber from which the clarified liquid is withdrawn. Within this latter chamber the solution flows in an upward direction. This materially facilitates the separation of the solids which are caused to settle out by gravity and are accordingly deposited on the sloping bottom wall of the tank. It will be observed that the rotating scraper arms 23 extend under the clarifying chamber and also under the aeration chamber. These rotating sweeps therefore have action with respect to the sludge and solids settling from both chambers. The deposited material is moved at a relatively slow rate on the sloping bottom of the tank to the sump 21 from which the sludge is withdrawn.

The manner in which the incoming liquid is delivered to the aeration chamber by the launder 11 constitutes an important feature of the present apparatus. From the launder the solution overflows the weir 15 and the same is thereby uniformly distributed throughout the entire peripheral extent of the aeration chamber. The organic load thus comes into contact with the filter media having large surface area and which is well able to take care of its distributed portion of the load. Also the supply of air is adequate for each portion of the load and it will be seen that as regards the present tank it is impossible for the liquid to bypass or short circuit the aeration chamber.

The upwardly flowing air currents in the aeration chamber will cause the coagulated grease and other material of similar nature to float on the surface of the liquid within said chamber. This floating material may be continuously withdrawn or may be withdrawn at intervals by any convenient means. In Figures 2 and 3 a grease launder 35 is provided comprising the horizontal bottom wall 36 and the vertical wall 37 having the outlet pipe 38 extending therefrom. The launder 35 may extend completely around the tank on the outside of wall 13 or the same may consist of individual sections. In either case the launder is provided with a plurality of openings 40. In the normal operation of the combination tank the incoming liquid will flow from the trough 11 over the weir 15 into the aeration chamber. When it is desired to skim the grease or other floating material from the surface of the liquid the flow of the clear effluent from the outlet 26 is stopped and the level of the liquid in the tank is thereby raised until the liquid within the aeration chamber reaches the level of the outlets 40. From then on any further rise in the liquid level will cause the solution to flow through said outlets 40 into the grease trough 35. The initial flow taking place through openings 40 will comprise the coagulated grease and other floating material from the surface of the liquid in the aeration chamber. After the flow has continued for a length of time to discharge most of this material the outlet pipe 26 is then opened and the flow of the clear effluent from said pipe is again continued. The level of the liquid within the tank will accordingly drop to a point below weir 15 when the normal liquid level is reached, which is determined by the position of the outlet ring 25.

In Figure 1 two combination tanks of the invention are coupled in series and preceded by a primary clarifier. The incoming sewage, trade wastes, or the like, are initially delivered by pipe 50 to the well 51 having an outlet 52 and which delivers the liquid to a lift pump 53. The lift pump is located within the dry well 54 and said pump delivers to the vertical pipe 55 having connection with the primary clarifier indicated in its entirety by 56. The pipe 55 has a horizontal section 57 which passes through the vertical wall 58 of the clarifier and also through the inner baffle wall 59 so that the liquid from the lift pump is discharged within the baffle 59, located centrally of the primary clarifier and which is substantially concentric with the outer wall 58 thereof. The baffle wall 59 is suitably supported in position and it will be understood that the liquid entering the chamber formed thereby will be caused to flow downwardly toward the bottom 60 of the primary clarifier. The liquid thereupon enters the settling chamber of the clarifier and in this chamber the flow of the liquid is in an upward direction toward the overflow weir 61. The upflow of the liquid tends to cause a large proportion of the solids to settle out and the sludge which accumulates on the sloping bottom 60 of the clarifier is moved toward the central discharge pipe 62 by the scraper arms 63 suitably supported and rotated by rod 65. The discharge pipe 62 is provided with a valve 66 so that the flow from this pipe can be controlled.

The liquid overflowing the weir 61 is taken by the pipe 68 and delivered to launder 11 of the combined aeration and settling tank comprising the first stage of the present equipment. From the launder 11 the solution overflows into the aeration chamber and is eventually delivered to the clarifying chamber, as described with respect to Figures 2 and 3. The effluent from the outlet ring 25 is conducted by pipe 69 to the second stage combination aeration and settling tank. In this latter tank the solution is again subjected to aeration and to purification as a result of contact of the liquid with the biological organisms forming the activated slime coating on the plates 27. The final settling takes place within the clarifying chamber of this second stage tank and the clear effluent flows from outlet ring 25 to the outlet pipe 100.

The sludge outlets for the tanks, namely, 62 for the primary clarifier, and 22 for the first and second stage combination tanks, respectively, are joined by pipe 101 connecting with the sludge pump 102. The flow from this sludge pump may be delivered through pipe 103 back to the primary clarifier or by pipe 104 to a digester.

In Figure 4 a modified arrangement is disclosed by which additional filter media may be economically added to the aeration chamber of a combination tank such as shown in Figures 3 and 4. The additional plates 105 are suitably supported from or integral with plates 27 and it will be observed that said additional plates are diagonally disposed with respect thereto. This diagonal positioning of the additional plates maintains the desired distance between adjacent plates although only alternate plates 27 are provided with such extensions. In other respects the construction and operation of the tank of Figure 4 is the same as previously described, the tank having an inlet pipe 14 for the incoming sewage discharging into a peripheral launder 11. The aeration chamber 18 is increased in width and large surface area is provided by the filter media as a result of the extensions to plates 27 provided by the diagonal plates 105. The cylindrical baffle wall 16 is generally of the same diameter as that shown in Figure 3 and the clear effluent from the clarifying chamber 17 is drawn off from the tank of Figure 4 by the outlet ring 25 and outlet pipe 26.

Although the aeration chamber in Figures 2 and 3 is shown as extending around a centrally located clarifying chamber it is, of course, possible to reverse said chambers, in which case the aeration chamber would comprise the space within the baffle wall 16 and the clarifying chamber would comprise the peripheral space between said baffle wall and the wall 10 of the tank. The present combination tank has many desirable features which make possible certain constructional economies with better purification of the sewage. As a result of the present design the coagulated grease and other floating material will collect on the surface of the liquid within the aeration chamber. All possibility of this grease passing through the apparatus has been eliminated in the present design and by raising the liquid level in the apparatus this grease and other floating material can be diverted to the auxiliary launder and removed from the apparatus. Although the liquid flows downwardly in the aeration chamber the air currents flow in an upward direction and said currents keep the light sludge in suspension in the liquid until coagulated into heavier particles which settle out in the settling chamber. The air not only coagulates the colloidal material but also oxidizes many unstaple compounds in the sewage to staple forms. The scraper mechanism is common to both chambers, having a length whereby the arms extend across the entire tank bottom. Accordingly, the deposited sludge is removed from under both chambers before septic action can take place.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A combination aeration and settling tank comprising an exterior vertical wall and a connecting bottom wall, a baffle member within the tank in spaced relation to the walls thereof, said baffle member extending from the top of the tank to adjacent the bottom wall and dividing the tank into an aeration chamber and a settling chamber with a connecting passage below the said baffle member for joining the lower portion of said chambers, said aeration chamber in the upper portion thereof having an influent trough for supplying incoming liquid to the chamber, filter media within the aeration chamber below the trough and below the top edge of the baffle member, air supply means also located within said aeration chamber below the filter media, an outlet for clear liquid having location in the upper portion of the settling chamber at a point below the top edge of the baffle member, and sludge removing mechanism including scraper arms movable over the bottom wall of the tank substantially parallel thereto and extending under both said chambers.

2. A combination aeration and settling tank as defined by claim 1, wherein the bottom wall is provided with a central discharge opening for withdrawing from the tank the sludge from both said chambers.

3. A combination aeration and settling tank as defined by claim 1, additionally including a grease launder located below the top edge of the baffle member and having associated relation with the aeration chamber, said launder having openings connecting the same with the aeration chamber and which openings are positioned above the normal level of the liquid in said chamber.

4. A combination aeration and settling tank comprising an exterior vertical wall and a connecting bottom wall, a baffle member within the tank in concentric and spaced relation with said exterior wall and in spaced relation with respect to the bottom wall, said baffle member extending from the top of the tank to adjacent the bottom wall and dividing the tank into a peripheral aeration chamber and a central settling chamber with a connecting passage below said baffle member for joining the lower portion of said chambers, said aeration chamber in the upper portion thereof having an influent trough throughout its peripheral extent for supplying incoming liquid to the chamber, filter media within the aeration chamber below the trough and below the top edge of the baffle member, air supply means also located within the aeration chamber below the filter media, an outlet for clear liquid having location in the upper portion of the settling chamber at a point below the top edge of the baffle member, and sludge removing mechanism including rotatable scraper arms extending under both said chambers and having movement over the bottom wall of the tank for removing the sludge to a common outlet.

JOHN A. MONTGOMERY.
LOUIS E. LIVINGSTON.

REFERENCES CITED

The following references are of record in the file of this patent:

UNITED STATES PATENTS

| Number | Name | Date |
|---|---|---|
| 830,552 | Zeigler | Sept. 11, 1906 |
| 1,396,397 | Borst | Nov. 8, 1921 |
| 1,526,197 | Ahlqvist | Feb. 10, 1925 |
| 1,805,682 | Borst | May 19, 1931 |
| 2,008,507 | Laughlin | July 16, 1935 |
| 2,051,149 | Nordell | Aug. 18, 1936 |
| 2,056,062 | Zack | Sept. 29, 1936 |
| 2,223,257 | Mallory | Nov. 26, 1940 |
| 2,233,792 | Mallory | Mar. 4, 1941 |
| 2,322,017 | Hartman | June 15, 1943 |
| 2,353,358 | Prager | July 11, 1944 |
| 2,370,974 | Langdon | Mar. 6, 1945 |
| 2,377,545 | Felsecker | June 5, 1945 |
| 2,388,795 | Montgomery et al. | Nov. 13, 1945 |